(12) United States Patent
Fälldin et al.

(10) Patent No.: US 8,217,744 B2
(45) Date of Patent: Jul. 10, 2012

(54) TRANSFORMER ARRANGEMENT

(75) Inventors: Agne Fälldin, Sundsvall (SE); Fredrik Grivans, Hässelby (SE)

(73) Assignee: Hexaformer AB, Upplands Väsby (SE)

( * ) Notice: Subject to any disclaimer, the term of this patent is extended or adjusted under 35 U.S.C. 154(b) by 20 days.

(21) Appl. No.: 12/527,461

(22) PCT Filed: Feb. 20, 2008
(Under 37 CFR 1.47)

(86) PCT No.: PCT/SE2008/000137
§ 371 (c)(1),
(2), (4) Date: Jul. 16, 2010

(87) PCT Pub. No.: WO2008/108704
PCT Pub. Date: Sep. 12, 2008

(65) Prior Publication Data
US 2010/0295645 A1 Nov. 25, 2010

(30) Foreign Application Priority Data
Mar. 7, 2007 (SE) ........................................ 0700560

(51) Int. Cl.
*H01F 27/24* (2006.01)
*H01F 30/14* (2006.01)

(52) U.S. Cl. ........................... 336/10; 336/212; 336/213

(58) Field of Classification Search ........................ None
See application file for complete search history.

(56) References Cited

U.S. PATENT DOCUMENTS

| | | | |
|---|---|---|---|
| 1,537,371 A | 5/1925 | Petersen | |
| 2,149,683 A * | 3/1939 | Leyburn | 307/102 |
| 2,212,339 A * | 8/1940 | Cullen | 227/146 |
| 2,277,660 A * | 3/1942 | Boller | 427/377 |
| 2,287,990 A * | 6/1942 | Griscom | 307/147 |
| 2,303,445 A * | 12/1942 | Evans et al. | 361/47 |
| 2,315,609 A * | 4/1943 | Fielder | 307/105 |
| 2,394,648 A * | 2/1946 | Woolfolk | 29/605 |
| 2,400,184 A * | 5/1946 | Woolfolk | 336/212 |
| 2,431,155 A * | 11/1947 | Woolfolk | 336/212 |
| 2,498,747 A * | 2/1950 | Wiegand | 336/212 |
| 4,729,052 A * | 3/1988 | Winter | 361/42 |
| 4,862,059 A * | 8/1989 | Tominaga et al. | 323/307 |
| 6,573,726 B1 * | 6/2003 | Roberts et al. | 324/509 |
| 6,809,620 B2 * | 10/2004 | Hoglund | 336/5 |

FOREIGN PATENT DOCUMENTS

WO 9910959 A2 3/1999

OTHER PUBLICATIONS

PCT International Search Report, mailed May 27, 2008, in connection with International Application No. PCT/SE2008/000137.

* cited by examiner

*Primary Examiner* — Anh Mai
(74) *Attorney, Agent, or Firm* — Potomac Patent Group PLLC

(57) ABSTRACT

A transformer arrangement comprising a transformer having a neutral and formed as a symmetrical transformer, in particular a cage transformer and having a reactor coil connected to the neutral of the transformer is provided. The transformer can be of any type having a neutral such as a Y-n/Y-n, Z-n/Z-n, Y-n/Z-n or a Z-n/Y-n transformer. By providing a transformer having symmetrical phases connected to a reactor coil a transformer arrangement having less weight is obtained. The lower weight is obtained because in comparison to using an E core for the transformer all phases will be symmetrical so that if a ground fault occurs in one of then phases there is no need for any compensatory windings regardless of which phase suffers the ground fault.

16 Claims, 2 Drawing Sheets

US 8,217,744 B2

TRANSFORMER ARRANGEMENT

TECHNICAL FIELD

The present invention relates to a transformer arrangement and in particular to a transformer arrangement comprising a transformer connected to a reactor for interconnecting the transformer with ground.

BACKGROUND

Electricity distribution is the penultimate stage in the delivery (before retail) of electricity to end users. It is generally considered to include medium-voltage (typically less than 50 kV) power lines, electrical substations and pole-mounted transformers, low-voltage (typically less than 1000 V).

In transformer arrangement used for electrical power distribution a reactor coil is sometimes employed. A reactor coil is an electrical device used for generating reactive power. Reactors are used in many different environments. One application for a reactor is as a grounding reactor, used in alternating-current power transmission systems. It can then be designed and used to limit the current flowing to ground at the location of a fault almost to zero by setting up a reactive current to ground that balances the capacitive current to ground flowing from the lines. Such an arrangement is also known as a Petersen coil.

Hence, a transformer supplemented by a reactor connected to a neutral node of the primary side of the transformer is typically used in a transformer arrangement in the distribution network of an electrical power transmission system.

The combination of a transformer and a reactor is typically used at the primary side of an electricity distribution network. The transformer arrangement is heavy and there is a desire to make such transformer arrangements with lower weight without reducing performance. Also because the transformer arrangement is heavy and made of fairly costly material there is a desire to reduce the amount of material required to manufacture such a transformer arrangement.

Therefore there exists a need for a reactor core that is easy to manufacture and which requires less material than a conventional reactor core, thereby making it weigh less.

SUMMARY

It is an object of the present invention to overcome or at least reduce some of the problems associated with existing transformer arrangements comprising a transformer and a reactor coil.

It is another object of the present invention to provide a transformer arrangement comprising a transformer and a reactor coil that is easy to manufacture and which is efficient in terms of material need.

It is yet another object of the present invention to provide a transformer arrangement comprising a transformer and a reactor coil having a reduced weight.

These objects and others are obtained by a transformer arrangement as set out in the appended claims. Hence a transformer arrangement comprising a transformer having a neutral and formed as a symmetrical transformer, in particular a cage transformer and having a reactor coil connected to the neutral of the transformer is provided.

The cage transformer can be of any type having a neutral such as a Y-n/Y-n, Z-n/Z-n, Y-n/Z-n or a Z-n/Y-n transformer.

By providing a transformer having symmetrical phases connected to a reactor coil a transformer arrangement having less weight is obtained. The lower weight is obtained because in comparison to using an E core for the transformer all phases will be symmetrical so that if a ground fault occurs in one of then phases there is no need for any compensatory windings regardless of which phase suffers the ground fault. In a conventional transformer arrangement having an E-shaped core for the transformer, the different a grounding fault will result in different needs of reactive power compensation depending on which phases suffers the grounding. Hence, there is a need for additional windings of different types in order to compensate for the different outcomes for grounding faults in different phases in a conventional transformer arrangement.

The invention solves the problem of having to make use of additional windings for compensating for the different needs of reactive power depending on which phase that suffers a grounding fault by providing a symmetrical transformer, in particular a cage transformer, which by nature is symmetrical with respect to all phases and therefore will have the same need for reactive power irrespective of which phase suffers a grounding fault.

Because the is no need for any additional windings for taking into account the different scenarios that can occur in conventional transformer arrangements, a transformer arrangement in accordance with the present invention will have a significantly lower weight. Also because there are fewer components that need to be assembled the transformer arrangement in accordance with the present invention is easy to manufacture.

BRIEF DESCRIPTION OF THE DRAWINGS

The present invention will now be described in more detail by way of non-limiting examples and with reference to the accompanying drawings, in which:

FIG. 2b is a top view of the arrangement shown in FIG. 2a.

DETAILED DESCRIPTION

Figure 1:
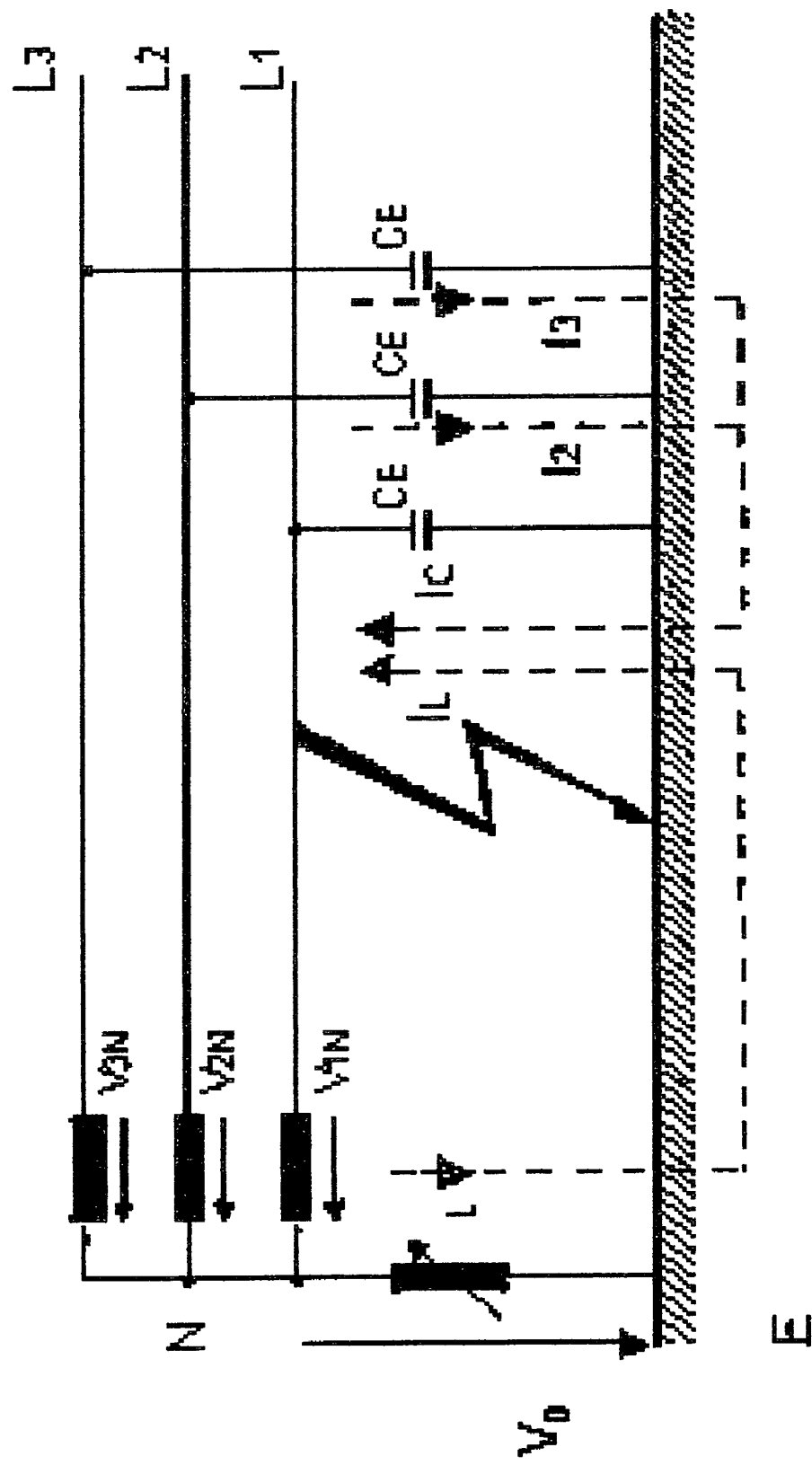
FIG. 1 is a general view of a distribution network for electrical power.

In FIG. 1, a view of an electrical power transmission system having three phases is depicted. The system comprises a transformer connected Y or Z and further being provided with a Petersen coil (L). The Petersen coil (L) is interconnected between the neutral (N) of the primary side of the transformer and Earth/Ground (E). Each of the three phases is associated with a capacitive loss CE. In the case when the three phases of the power transmission line are located closely together such as in a cable underground, the capacitive losses CE will be much larger than for air transmission lines, but there will still be a capacitive loss for air-transmission lines albeit smaller than for underground cables.

In case of a ground fault for one of the phases L1, L2 or L3, the Petersen coil (L) will generate a reactive current (IL) compensating for the capacitive currents (I2, I3, Ic) that starts to flow in the system as a result of the ground fault.

Figure 2A:
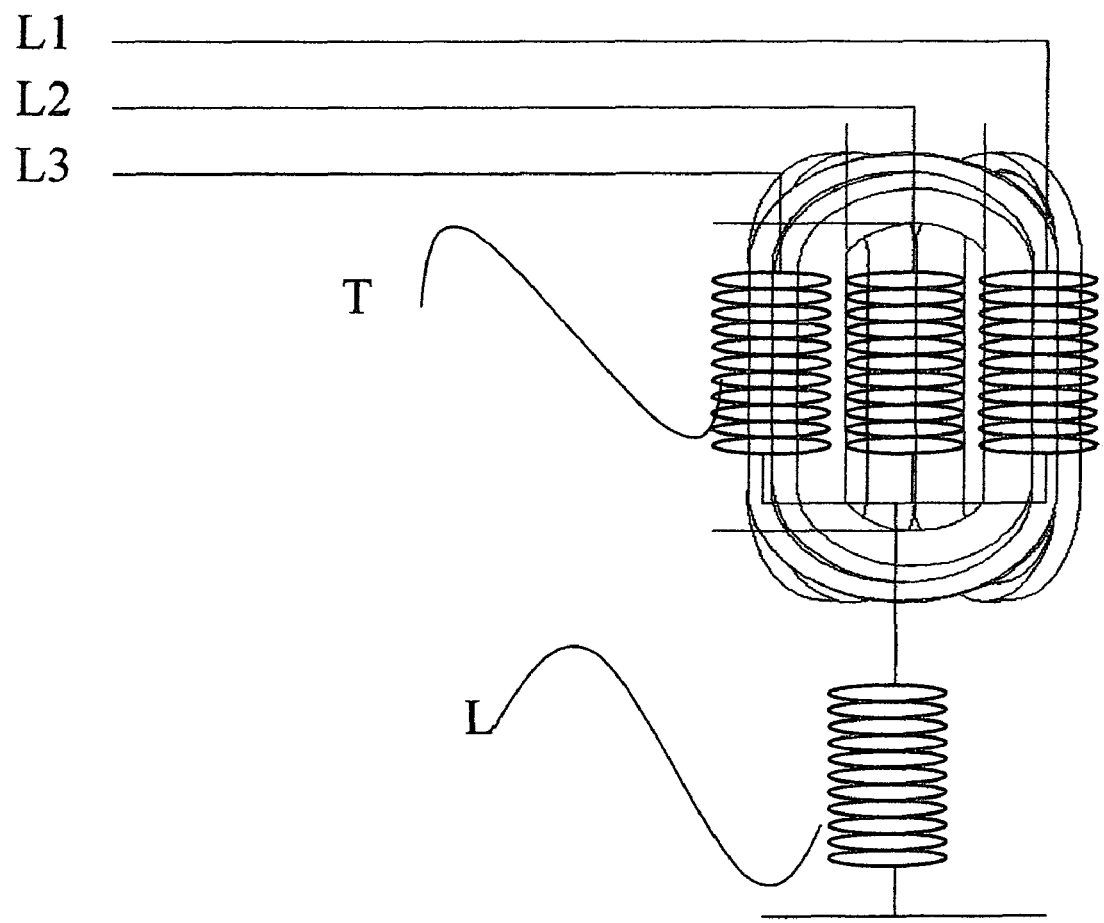
FIG. 2a is a view of a transformer arrangement comprising a transformer and a reactor coil.
Figure 2B:
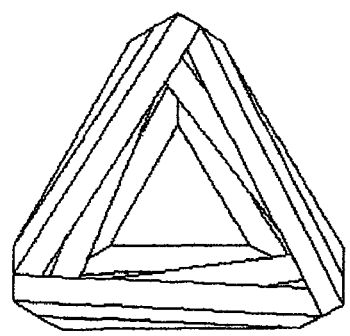

In FIG. 2 a transformer arrangement is shown. The arrangement comprises a cage transformer (T) having a neutral and three phases. The arrangement further comprises a reactor coil sometimes termed a Petersen Coil (L) connected to the neutral of the transformer. In a preferred embodiment the transformer has a generally triangular shape as seen from the top and the reactor coils is located beneath the transformer and also has a generally triangular shape as seen from the top. The arrangement with a generally triangular coil located together with a generally triangular transformer makes the combined arrangement much smaller than conventional corresponding arrangements. In FIG. 2b the arrangement with a triangularly shaped transformer co-located with a triangularly shaped reactor coil as seen from the top is depicted.

Furthermore, the transformer can be of any type having symmetrical phases and having a neutral, such as a Y-n/Y-n, Z-n/Z-n, Y-n/Z-n or a Z-n/Y-n transformer.

By interconnecting a transformer and a reactor coil, a transformer arrangement having less weight is obtained. A low weight is also obtained because in comparison to using an E core for the transformer, all phases will be symmetrical if a ground fault occurs in one of the phases. In a conventional transformer arrangement having an E-shaped core for the transformer, the different a grounding fault will result in different needs of reactive power compensation depending on which phases suffers the ground fault. Hence, there is a need for additional windings of different types in order to compensate for the different outcomes for grounding faults in different phases.

Using the transformer arrangement and system as described herein makes use of additional windings for compensating for the different phases differently obsolete. Thus, because there is no need for any additional windings for taking into account the different scenarios that can occur in conventional transformer arrangements, the transformer arrangement as described herein will have a low weight. Also because there are fewer components that need to be assembled the transformer arrangement is easy to manufacture

The invention claimed is:

1. A transformer arrangement comprising a transformer having a neutral, the neutral being connected to a first terminal of a reactor and a second terminal of the reactor being adapted for connection to ground, wherein the transformer is symmetrical.

2. The transformer arrangement according to claim 1 when both the transformer and the reactor have a generally triangular shape as seen from one direction wherein the transformer and the reactor are located closely together having their triangularly shaped sides facing each other.

3. The transformer arrangement according to claim 1, wherein the transformer is connected as a Y-n/Y-n, or a Z-n/Z-n, or a Y-n/Z-n or a Z-n/Y-n transformer.

4. The transformer arrangement according to claim 3, wherein the transformer has a generally triangular shape as seen from one direction.

5. The transformer arrangement according to claim 3, wherein the reactor has a generally triangular shape as seen from one direction.

6. The transformer arrangement according to claim 3, wherein when both the transformer and the reactor a generally triangular shape as seen from one direction, the transformer and the reactor are located closely together having their triangularly shaped sides facing each other.

7. The transformer arrangement according to claim 1, wherein the transformer is a cage transformer.

8. The transformer arrangement according to claim 7, wherein the transformer has a generally triangular shape as seen from one direction.

9. The transformer arrangement according to claim 7, wherein the transformer is connected as a Y-n/Y-n, or a Z-n/Z-n, or a Y-n/Z-n or a Z-n/Y-n transformer.

10. The transformer arrangement according to claim 7, wherein the reactor has a generally triangular shape as seen from one direction.

11. The transformer arrangement according to claim 7, wherein when both the transformer and the reactor a generally triangular shape as seen from one direction, the transformer and the reactor are located closely together having their triangularly shaped sides facing each other.

12. The transformer arrangement according to claim 1, wherein the transformer has a generally triangular shape as seen from one direction.

13. The transformer arrangement according to claim 12, wherein the reactor has a generally triangular shape as seen from one direction.

14. The transformer arrangement according to claim 12, wherein when both the transformer and the reactor a generally triangular shape as seen from one direction, the transformer and the reactor are located closely together having their triangularly shaped sides facing each other.

15. The transformer arrangement according to claim 1, wherein the reactor has a generally triangular shape as seen from one direction.

16. The transformer arrangement according to claim 15, wherein when both the transformer and the reactor a generally triangular shape as seen from one direction, the transformer and the reactor are located closely together having their triangularly shaped sides facing each other.

* * * * *